US008832596B2

(12) United States Patent
Stephens et al.

(10) Patent No.: US 8,832,596 B2
(45) Date of Patent: Sep. 9, 2014

(54) SYSTEM AND METHOD FOR DISPLAY INPUT SELECTION

(75) Inventors: Jeffrey Stephens, Austin, TX (US); Andrew G. Habas, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1988 days.

(21) Appl. No.: 11/134,967

(22) Filed: May 23, 2005

(65) Prior Publication Data

US 2006/0282793 A1   Dec. 14, 2006

(51) Int. Cl.
*G06F 3/048* (2013.01)
*G06F 3/0485* (2013.01)

(52) U.S. Cl.
CPC .................... *G06F 3/0485* (2013.01)
USPC ........... 715/810; 715/718; 715/728; 715/825; 715/866

(58) Field of Classification Search
USPC ........................... 715/810, 718, 728, 825, 866
See application file for complete search history.

(56) References Cited

U.S. PATENT DOCUMENTS

| 5,650,827 | A |   | 7/1997 | Tsumori et al. | 348/565 |
|---|---|---|---|---|---|
| 5,818,428 | A | * | 10/1998 | Eisenbrandt et al. | 345/173 |
| 5,990,883 | A | * | 11/1999 | Byrne et al. | 715/721 |
| 6,069,623 | A | * | 5/2000 | Brooks | 715/866 |
| 6,133,910 | A | * | 10/2000 | Stinebruner | 725/49 |
| 6,208,388 | B1 | * | 3/2001 | Farleigh | 348/705 |
| 6,473,135 | B1 | * | 10/2002 | Iwamura | 348/706 |
| 6,587,154 | B1 | * | 7/2003 | Anderson et al. | 348/553 |
| 6,678,005 | B2 | * | 1/2004 | Anderson et al. | 348/553 |
| 6,753,928 | B1 | * | 6/2004 | Gospel et al. | 348/569 |
| 7,017,122 | B1 | * | 3/2006 | Lee et al. | 715/812 |
| 2006/0221254 | A1 | * | 10/2006 | Chang | 348/706 |

OTHER PUBLICATIONS www.support.dell.com/support/edocs/systems/W2600/dao/ENManual.Pdf; *Dell™ W2600 26" LCD TV Owner's Manual* [online]. Dell Inc., Nov. 2, 2004.

* cited by examiner

*Primary Examiner* — Anil N Kumar
(74) *Attorney, Agent, or Firm* — Terrile, Cannatti, Chambers & Holland, LLP; Robert W. Holland

(57) ABSTRACT

Input sources to a display, such as a television, are depicted with a first indicator if active, such as active with a signal having visual information, and are depicted with a second indicator if inactive, such as lacking an active signal. A selection module allows a user of the display to select an active source but precludes selection of an inactive source. For instance, a user is allowed to select highlighted input sources that are active but not allowed to select grayed out input sources that are inactive. An override allows the user to present all input sources with the first indicator, whether or not the input sources are active.

12 Claims, 2 Drawing Sheets

SYSTEM AND METHOD FOR DISPLAY INPUT SELECTION

BACKGROUND OF THE INVENTION

1. Field of the Invention

The present invention relates in general to the field of information handling system displays, and more particularly to a system and method for display input selection.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Perhaps the most prominent function of an information handling system is the display of information to an end user. Information handling system displays have evolved considerably over time. Initially, information handling systems used basic analog cathode ray tube (CRT) televisions to present information. The information handling system sent an analog signal tuned to a know channel and the television presented the information with conventional television resolution. However, information handling systems quickly outgrew television display technology since information handling systems were able to generate visual information with much greater resolution than conventional analog televisions could display. In order to communicate visual information from an information handling system to a display with greater resolution and to present the visual information at the display with the greater resolution, the information handling system industry developed a number of display technologies. The Color Graphics Adapter (CGA) was introduced in 1981 with a resolution of up to 640×200 pixels, the Enhanced Graphics Adapter was introduced in 1984 with a resolution of 640×350 pixels, and the Video Graphics Array (VGA) was introduced in 1987 with a resolution of 720×480 pixels. A number of extensions of VGA have increased screen resolutions to allow higher definitions of video information.

While information handling system resolutions steadily improved, television resolutions remained relatively stable until recently since analog television signals could carry only limited visual resolution information. Analog televisions did adapt to a number of potential signal inputs to accept visual information from various devices, including information handling systems. For instance, a typical analog television accepts component video signals and S-video signals in addition to analog tuner signals. The recent introduction of High Definition television has resulted in the availability of televisions with considerably improved resolution of 1920×1080 pixels in an interlaced format. The greater amount of visual information is generally made possible by transmitting a digital versus an analog signal. In order to get the digital information to a television, digital televisions typically accepts composite video signals, VGA signals, DVI signals, HDMI signals and digital tuner signals. Digital televisions also typically accept the same types of signals as analog televisions in order to support backwards compatibility. One difficulty that arises with digital televisions is that the large number of possible video interfaces tends to confuse consumers. Typically a television user interface presents a user with display of all possible inputs and the user selects the desired input. With so many options to choose from, users sometimes struggle to select an active interface having a desired video signal, such as a cable versus a DVD player input. Often, users believe the television is faulty when the selected input does not display an expected signal. This results in unnecessary calls for technical support or even return of the television.

SUMMARY OF THE INVENTION

Therefore a need has arisen for a system and method which presents display input sources distinguished between active and inactive status.

In accordance with the present invention, a system and method are provided which substantially reduce the disadvantages and problems associated with previous methods and systems for presenting display input sources. Input sources are polled to determine an active or inactive status for each input source. Active input sources are displayed with a first indicator to allow a user to select from among active input sources for inputting visual information to the display.

More specifically, a display panel presents visual information received at a display from one of plural input sources, such as analog and/or digital tuners or connectors to external devices that communicate visual information through component video, S-video, composite video, VGA, DVI and HDMI cables. An input detection module polls the plural input sources to determine active and inactive input sources. For instance, an input source is determined active if it has an active signal with visual information. Alternatively, an input source is determined active if it has a ground indicative of a cable coupled to an input connector associated with the input source. An input selection module presents the input sources so that active input sources are depicted with a first indication and inactive input sources are depicted with a second indication. For instance, active input sources are highlighted while inactive input sources are subdued, such as with a grayed out appearance or hidden from view. The input selection module allows a user to select active input sources to provide visual information to a display panel and precludes selection of inactive input sources. The input selection module selectively allows all input sources to be depicted with the first indication, such as to allow selection by a user of an inactive input source.

The present invention provides a number of important technical advantages. One example of an important technical advantage is that a user of a display is presented with active input sources that carry a signal for the display selectable by the user without inactive input sources that do not carry a signal for the display. Less input options means less user confusion and a greater chance that a user will select a desired input sources. Less input options also allows a user to scroll through the available options more quickly, while the ability to selectively high light all input sources ensures access to inactive sources. Further, the display of active versus inactive states for each input source helps to diagnose display difficulties by showing whether or not a signal is communicated to the display. For instance, a call for technical assistance allows the agent to determine whether a display fault has failed present visual information from an active device or the device is simply not connected correctly to the display.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Presentation of input sources at a display with an indication of those input sources having an active signal simplifies selection by a user of a desired input signal, such as a signal from an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
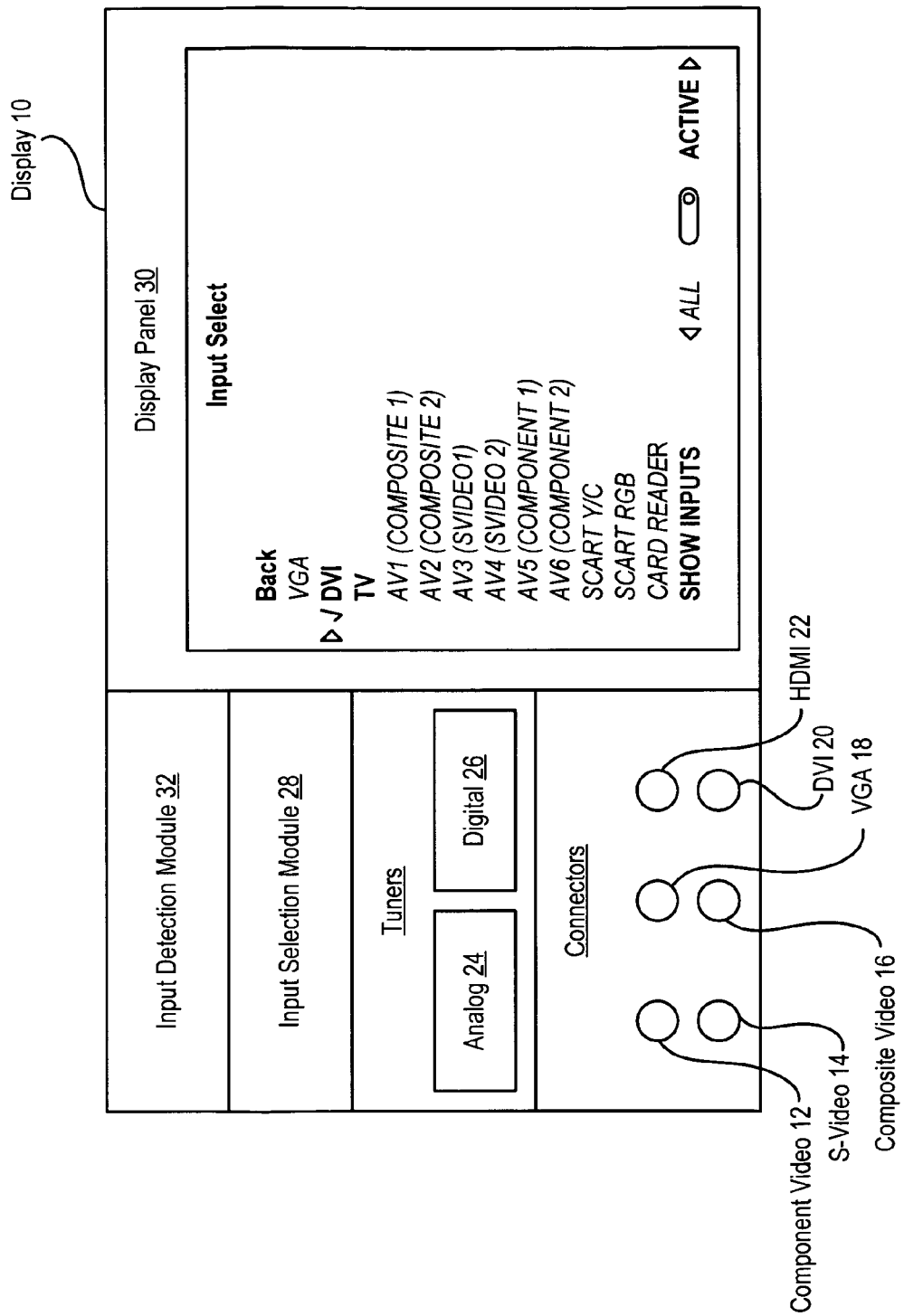
FIG. 1 depicts a functional block diagram of a display with active input source indication.

Referring now to FIG. 1, a functional block diagram depicts a display 10 with active input source indication. Display 10 accepts visual information from plural input sources, including a component video connector 12, a S-video connector 14, a composite video connector 16, a VGA connector 18, a DVI connector 20, a HDMI connector 22, an analog tuner 24 and a digital tuner 26. An input selection module 28 presents the input sources on display panel 30 so that a user can select the input source that provides visual information for presentation at display panel 30. For instance, input selection module 28 presents a list of all possible input sources, which the user can cycle through with an arrow key or remote control to select a desired input source. Once the user selects a desired input source, the visual information from that source is presented at display panel 30 in the place of the list of input sources. If, for instance, a selected input source does not have visual information, display panel 30 typically presents static or a plain image. An input detection module 32 interfaces with the input sources and the input selection module to aid a user in the selection of an active input source. Input detection module polls the input sources to determine whether each input source has an active or inactive status and provides the status of each input source to input selection module 28. For instance, input detection module 32 polls the input sources when a user activates the input source menu with input selection module 28. In one embodiment, input detection module uses secondary display mode, such as a picture-in-picture (PIP) mode, to check each input connector for an active signal having visual information and determines connectors with active visual information signals to have an active status. Use of the PIP mode allows uninterrupted use of the primary display mode during the polling. In this embodiment, an input source is active if, for instance, a device like an information handling system is connected to display 10 and has power applied. In an alternative embodiment, input detection module 32 polls the ground signal of each connector to determine input sources active if a connector has a cable connected to it, whether or not an active signal with visual information is present. In this alternative embodiment, an input source is active if, for instance, a device like an information handling system is connected to display 10 without requiring power applied to the device.

Once input detection module 32 determines the active or inactive status of the input sources, input selection module 28 presents at display panel 30 a list of the input sources for selection by a user. Active input sources are indicated with a first indication and inactive input sources are indicated with a second indication. In the example input selection display presentation of FIG. 1, active input sources are indicated with high lighting, such as the DVI and TV input sources, while inactive input sources are indicated with a subdued depiction, such as grayed out lettering or hidden from view. Input selection module 28 allows a user to select the active inputs but does not cycle through the inactive inputs, thus reducing the time needed for a user to select an input source with visual information. For instance, the presentation of FIG. 1 indicates that DVI and TV tuner input sources are active and the checkmark indicates that the DVI input source is selected. The user can cycle between these two active input sources but cannot cycle through the inactive grayed-out input sources, such as the composite, Svideo, component, Scart and card reader input sources. If the user wishes to select an inactive input source, then the user selects "all" for show inputs mode instead of "active" and all input sources are presented as high lighted whether or not active. In an alternative embodiment, inactive sources are selectable even when grayed out, such as with a user-configurable display option.

Figure 2:
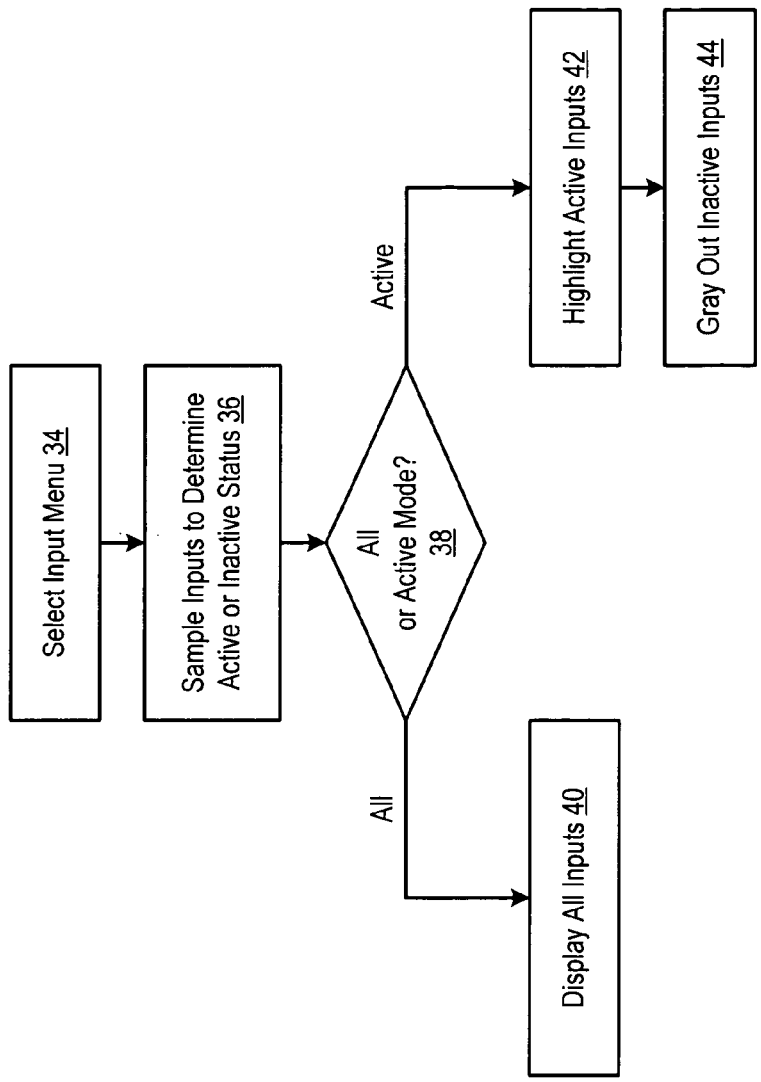
FIG. 2 depicts a flow diagram of a process for selective display of active and inactive inputs with associated indictors.

Referring now to FIG. 2, a flow diagram depicts a process for selective display of active and inactive inputs with associated indictors. The process begins at step 34 with the selection of an input source menu for presentation at the display. At step 36, samples are taken from each input source to determine if each input source has an active or inactive status. For instance, all input sources are polled and an active status assigned to each input source that provides visual information. At step 36, a determination is of whether all input sources should be displayed or just active input sources. If all input sources are selected for display, the process continues to step 40 to display all input sources with the same indication whether or not the input sources are active or inactive. In active input sources are selected for display, the process continues to step 42 for display of active input sources with highlight indication and to step 44 for display of inactive input sources with grayed out indication. Upon selection of an input source, the input source menu is replaced with the visual information from the selected input source.

Although the present invention has been described in detail, it should be understood that various changes, substitutions and alterations can be made hereto without departing from the spirit and scope of the invention as defined by the appended claims.

What is claimed is:

1. A display comprising:
    a display panel operable to display visual information from a selected one or more of plural inputs;
    plural input connectors, each input connector operable to receive visual information;
    an input detection module stored in non-transitory memory operable to determine if the input connectors are connected or unconnected; and
    an input selection module stored in non-transitory memory, interfaced with the input detection module and operable to display connected input connectors with a first indicator and unconnected input connectors with a second indicator;
    wherein the input selection module is further operable to accept a user selection of an connected input connector and prevent a user selection of the unconnected input connectors.

2. The display of claim 1 wherein the input selection module is further operable to selectively display all input connectors with the first indicator.

3. The display of claim 1 wherein the first indicator is highlighted and the second indicator is grayed out.

4. The display of claim 1 wherein the display panel has a primary display mode and a secondary display mode, the input detection module further operable to determine if connectors are connected or unconnected by interfacing with the connectors through the secondary display mode.

5. A method for selecting an input source for a display from plural input sources, the method comprising:
    polling the input sources to determine active input sources and inactive input sources;
    presenting the active input sources at the display with a first indicator;
    subduing the presenting of the inactive input sources at the display;
    preventing user selection of the inactive input connectors; and
    accepting a user selection of an active input source at the display.

6. The method of claim 5 wherein in subduing the presenting of the inactive input sources further comprises hiding the inactive input sources from display.

7. The method of claim 5 wherein subduing the presenting of the inactive input sources further comprises presenting the inactive input sources at the display with a second indicator.

8. The method of claim 5 further comprising:
    selectively presenting the inactive input sources at the display with the first indicator.

9. The method of claim 5 wherein polling further comprises:
    detecting a change in ground at a connector to determine that the input source associated with the connector is active, wherein active comprises having a cabled coupled to the connector, the cable with or without a signal.

10. The method of claim 5 wherein polling further comprises:
    detecting a video signal at a connector to determine that the input source associated with the connector is active, wherein active comprises having a cable connected to the connector, the cable having a signal.

11. The method of claim 5 further comprising:
    detecting a user request to select an input source; and
    activating a PIP mode to perform the polling.

12. The method of claim 5 wherein the input sources comprise one or more of component video, composite video, S-video, digital tuner, analog tuner and DVI.

* * * * *